UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PRINTING-PASTE.

978,139. Specification of Letters Patent. Patented Dec. 13, 1910.

No Drawing. Application filed April 29, 1909. Serial No. 492,988.

*To all whom it may concern:*

Be it known that I, JOSEPH DEINET, a citizen of the German Empire, residing at Elberfeld, Germany, have invented new and useful Improvements in New Printing-Pastes, of which the following is a specification.

I have made the surprising discovery that the dibenzoyl-1.8-diaminoanthraquinone can be used as a valuable dye for printing the textile fiber. It yields with reducing and thickening agents valuable pastes which dye the fiber yellow shades of excellent fastness.

In order to carry out my invention, I proceed as follows, the parts being by weight: 100 parts of dibenzoyl-1.8-diaminoanthraquinone (10 per cent. paste consisting of 10% color and 90% water) are mixed with 74 parts of tragacanth thickening (65:1000). 1.1 parts of tin crystals, 7 parts of copperas powder, 8 parts of tartaric acid are added and the paste is well stirred. Print, run through soda lye (18° Bé.) at 85°, acidulate, rinse and soap at 60° C. A very fast clear yellow orange shade is thus obtained which remains unchanged upon boiling with 10% muriatic acid and remains also unchanged upon being touched with cold dilute and cold concentrated nitric acid and which upon being touched with a watery solution containing 0.4% of anhydrous hydrosulfite of sodium and 0.8% of caustic soda changes its color of yellow to rust-brown which on exposure to air assumes again its original appearance. Other reducing agents e. g. hydrosulfites may be used.

I claim:

1. A printing paste comprising the leuco compound obtained by treating dibenzoyl-1.8-diaminoanthraquinone with reducing agents in conjunction with thickening agents, characterized by producing on the fiber after oxidation a yellow shade which remains unchanged upon boiling with 10% muriatic acid and remains also unchanged upon being touched with cold dilute and cold concentrated nitric acid and which upon being touched with a watery solution containing 0.4% of anhydrous hydrosulfite of sodium and 0.8% of caustic soda changes its color of yellow to rust-brown which on exposure to air assumes again its original appearance, substantially as described.

2. A printing paste comprising the leuco compound obtained by treating dibenzoyl-1.8-diaminoanthraquinone with tin crystals, copperas powder and tartar powder in conjunction with thickening agents, characterized by producing on the fiber after oxidation a yellow shade which remains unchanged upon boiling with 10% muriatic acid and remains also unchanged upon being touched with cold dilute and cold concentrated nitric acid and which upon being touched with a watery solution containing 0.4% of anhydrous hydrosulfite of sodium and 0.8% of caustic soda changes its color of yellow to rust-brown which on exposure to air assumes again its original appearance, substantially as described.

In testimony whereof I have hereunto set my hand in the presence of two subscribing witnesses.

JOSEPH DEINET. [L. S.]

Witnesses:
  OTTO KÖNIG,
  C. J. WRIGHT.